United States Patent
Dunjic et al.

(10) Patent No.: US 12,254,511 B2
(45) Date of Patent: Mar. 18, 2025

(54) MULTI-PART REQUEST FOR TRANSFERS

(71) Applicant: The Toronto-Dominion Bank, Toronto (CA)

(72) Inventors: Milos Dunjic, Oakville (CA); David Samuel Tax, Toronto (CA); Kushank Rastogi, Toronto (CA); Casie Jade Forster, Toronto (CA); Somea Shahed, Toronto (CA); Margaret Elizabeth Inden, Toronto (CA)

(73) Assignee: The Toronto-Dominion Bank, Toronto (CA)

( * ) Notice: Subject to any disclaimer, the term of this patent is extended or adjusted under 35 U.S.C. 154(b) by 317 days.

(21) Appl. No.: 17/401,520

(22) Filed: Aug. 13, 2021

(65) Prior Publication Data
US 2023/0046386 A1 Feb. 16, 2023

(51) Int. Cl.
*G06Q 40/02* (2023.01)
*G06Q 20/10* (2012.01)
*H04L 67/06* (2022.01)
*G06Q 30/04* (2012.01)

(52) U.S. Cl.
CPC ........... *G06Q 40/02* (2013.01); *G06Q 20/108* (2013.01); *H04L 67/06* (2013.01); *G06Q 30/04* (2013.01)

(58) Field of Classification Search
CPC ...... G06Q 40/02; G06Q 20/108; G06Q 30/04; H04L 67/06
See application file for complete search history.

(56) References Cited

U.S. PATENT DOCUMENTS

| | | | |
|---|---|---|---|
| 6,044,362 A | 3/2000 | Neely | |
| 7,702,579 B2 | 4/2010 | Neely et al. | |
| 8,566,230 B2 | 10/2013 | Walker et al. | |
| 8,620,807 B2 | 12/2013 | Meier et al. | |
| 8,662,997 B1 * | 3/2014 | McCuller | A63F 13/69 463/25 |

(Continued)

FOREIGN PATENT DOCUMENTS

| | | |
|---|---|---|
| CN | 111028022 | 4/2020 |
| KR | 1020120008229 | 1/2012 |
| KR | 1020200104175 | 9/2020 |

OTHER PUBLICATIONS

Emily Hale; How To Send An Invoice With Square & Get Paid Faster, Published in Merchant Maverick; https://www.merchantmaverick.com/how-to-use-square-invoices/; published Apr. 8, 2020.

*Primary Examiner* — Ajay M Bhatia
*Assistant Examiner* — Chongsuh Park
(74) *Attorney, Agent, or Firm* — Rowand LLP (57) ABSTRACT

A request to separate a transfer into a plurality of parts may be received, the request defining a total amount and a total time period. A plurality of request for transfer links may be prepared. Each of the links may be associated with a different transfer time period, each transfer time period being less than or equal to the total time period. Each of the links may be associated with a separate transfer part amount, and a summation of the separate transfer part amounts may be equal to the total amount. A plurality of request for transfer links may be provided to a transferor device, each link allowing a transfer to fulfill the separate transfer part amount to be performed without requiring input of the separate transfer part amount or recipient information.

18 Claims, 7 Drawing Sheets

(56) References Cited

U.S. PATENT DOCUMENTS

| | | | |
|---|---|---|---|
| 9,928,489 B2 | 3/2018 | Ohnishi et al. | |
| 10,699,264 B1 | 6/2020 | Barman | |
| 2008/0133771 A1* | 6/2008 | Vardi | H04L 12/64 709/238 |
| 2014/0074701 A1* | 3/2014 | Kingston | G06Q 20/10 705/40 |
| 2014/0337188 A1 | 11/2014 | Bennett et al. | |
| 2015/0073911 A1 | 3/2015 | Zhao | |
| 2016/0034875 A1 | 2/2016 | Stevens et al. | |
| 2016/0321017 A1* | 11/2016 | Matsubara | G06F 3/1241 |
| 2020/0067709 A1* | 2/2020 | Brown | H04L 9/3265 |
| 2020/0097935 A1 | 3/2020 | Takahashi et al. | |
| 2020/0151697 A1 | 5/2020 | Pinto et al. | |
| 2020/0160296 A1 | 5/2020 | Park et al. | |
| 2020/0184278 A1* | 6/2020 | Zadeh | G06N 3/044 |
| 2020/0327528 A1* | 10/2020 | Ratcliffe | G06Q 20/227 |
| 2021/0124744 A1* | 4/2021 | Gladwin | G06F 16/24545 |
| 2021/0374865 A1* | 12/2021 | Boydell | G06Q 40/04 |

\* cited by examiner

DOCUMENT DETAILS

INVOICE NUMBER      INVOICE DATE

610 —— 0483            Jan 1 2022   —— 620

TOTAL AMOUNT DUE    120 units    —— 630

DESIRED TRANSFER
PERIOD

640 ——
- 1 Month
- 2 Months
- 6 Months
- 12 Months

SUBMIT

FIG. 6

| Transfer Number | Part Transfer Period | Time Part Transfer Amount | Part Transfer Date |
|---|---|---|---|
| 1 | 1 month | 20 units | Feb 1, 2022 |
| 2 | 2 months | 20 units | Mar 1, 2022 |
| 3 | 3 months | 20 units | Apr 1, 2022 |
| 4 | 4 months | 20 units | May 1, 2022 |
| 5 | 5 months | 20 units | Jun 1, 2022 |
| 6 | 6 months | 20 units | Jul 1, 2022 |

FIG. 7

FIG. 8

MULTI-PART REQUEST FOR TRANSFERS

TECHNICAL FIELD

The present application relates to data transfers and, more particularly, to systems and methods for processing a request to separate a transfer into a plurality of parts.

BACKGROUND

It is sometimes necessary or desirable to conduct transfers between database records. For example, transfers are sometimes made from a first record to a second record. The transfers may sometimes occur within the same database and sometimes the transfers may occur between different databases. In some instances, the databases may reside on different systems which may connect to one another through a network.

A resource transfer may represent a permanent or temporary movement of a defined quantum of resources to an intended storage location. Requests to transfer certain resources (e.g., a certain amount of data) from a first record to a second record may be received by a system associated with the first record.

It may be desirable to provide an efficient and secure mechanism for transferring requested resources from a first record to a second record in a series of parts over a time period.

BRIEF DESCRIPTION OF THE DRAWINGS

Embodiments are described in detail below, with reference to the following drawings.

Like reference numerals are used in the drawings to denote like elements and features.

DETAILED DESCRIPTION OF VARIOUS EMBODIMENTS

In accordance with one aspect of the present invention, there is provided a computing system comprising: a communications module; a processor coupled to the communications module; and a memory coupled to the processor storing instructions that, when executed by the computing system, cause the computing system to: receive a request to separate a transfer into a plurality of parts, the request defining a total amount and a total time period; prepare a plurality of request for transfer links, each of the links associated with a different transfer time period, wherein each transfer time period is less than or equal to the total time period, each of the links associated with a separate transfer part amount, wherein a summation of the separate transfer part amounts is equal to the total amount; and provide the plurality of request for transfer links to a transferor device, each link allowing a transfer to fulfill the separate transfer part amount to be performed without requiring input of the separate transfer part amount or recipient information.

In at least some implementations, separate transfer part amounts are equal.

In at least some implementations, each of the request for transfer links is only valid during the transfer time period associated with the request for transfer link.

In at least some implementations, the total time period is determined based on a final transfer due date included in the request.

In at least some implementations, the plurality of request for transfer links are provided to the transferor device at once.

In at least some implementations, the plurality of request for transfer links are provided to the transferor device at scheduled times.

In at least some implementations, each of the plurality of request for transfer links are sent to the transferor device at or near an end of the different transfer time period associated with the request for transfer link.

In at least some implementations, the transfer is associated with a document, and the instructions, when executed by the computing system, further cause the computing system to: receive, from the transferor device, at least one transfer associated with one of the plurality of request for transfer links; associate the at least one transfer with the document; and in response to receiving all the transfers associated with the plurality of request for transfer links, reconcile the transfers with the document.

In at least some implementations, the request to transfer is a request to transfer value from a transferor account to a recipient account.

In at least some implementations, prior to receiving the request to separate the transfer into the plurality of parts, the instructions, when executed by the computing system, further cause the computing system to: send a document to the transferor device, the document including a selectable option to request separation of the transfer into the plurality of parts.

In at least some implementations, the selectable option includes an option to define the total time period.

In at least some implementations, prior to preparing a plurality of request for transfer links, the instructions, when executed by the computing system, further cause the computing system to: validate the request to separate a transfer into a plurality of parts.

In accordance with another aspect of the present invention, there is provided a computer-implemented method, comprising: receiving a request to separate a transfer into a plurality of parts, the request defining a total amount and a total time period; preparing a plurality of request for transfer links, each of the links associated with a different transfer time period, wherein each transfer time period is less than or equal to the total time period, each of the links associated with a separate transfer part amount, wherein a summation of the separate transfer part amounts is equal to the total amount; and providing the plurality of request for transfer links to a transferor device, each link allowing a transfer to fulfill the separate transfer part amount to be performed without requiring input of the separate transfer part amount or recipient information.

In at least some implementations, the separate transfer part amounts are equal.

In at least some implementations, each of the request for transfer links is only valid during the transfer time period associated with the request for transfer link.

In at least some implementations, the total time period is determined based on a final transfer due date included in the request.

In at least some implementations, the plurality of request for transfer links are provided to the transferor device at once.

In at least some implementations, the plurality of request for transfer links are provided to the transferor device at scheduled times.

In at least some implementations, each of the plurality of request for transfer links are sent to the transferor device at or near an end of the different transfer time period associated with the request for transfer link.

In accordance with another aspect of the present invention, there is provided a non-transitory computer-readable storage medium storing instructions that when executed by a processor of a computing system cause the computing system to: receive a request to separate a transfer into a plurality of parts, the request defining a total amount and a total time period; prepare a plurality of request for transfer links, each of the links associated with a different transfer time period, wherein each transfer time period is less than or equal to the total time period, each of the links associated with a separate transfer part amount, wherein a summation of the separate transfer part amounts is equal to the total amount; and provide the plurality of request for transfer links to a transferor device, each link allowing a transfer to fulfill the separate transfer part amount to be performed without requiring input of the separate transfer part amount or recipient information.

In the present application, the term "and/or" is intended to cover all possible combinations and sub-combinations of the listed elements, including any one of the listed elements alone, any sub-combination, or all of the elements, and without necessarily excluding additional elements.

In the present application, the phrase "at least one of . . . or . . . " is intended to cover any one or more of the listed elements, including any one of the listed elements alone, any sub-combination, or all of the elements, without necessarily excluding any additional elements, and without necessarily requiring all of the elements.

Figure 1:
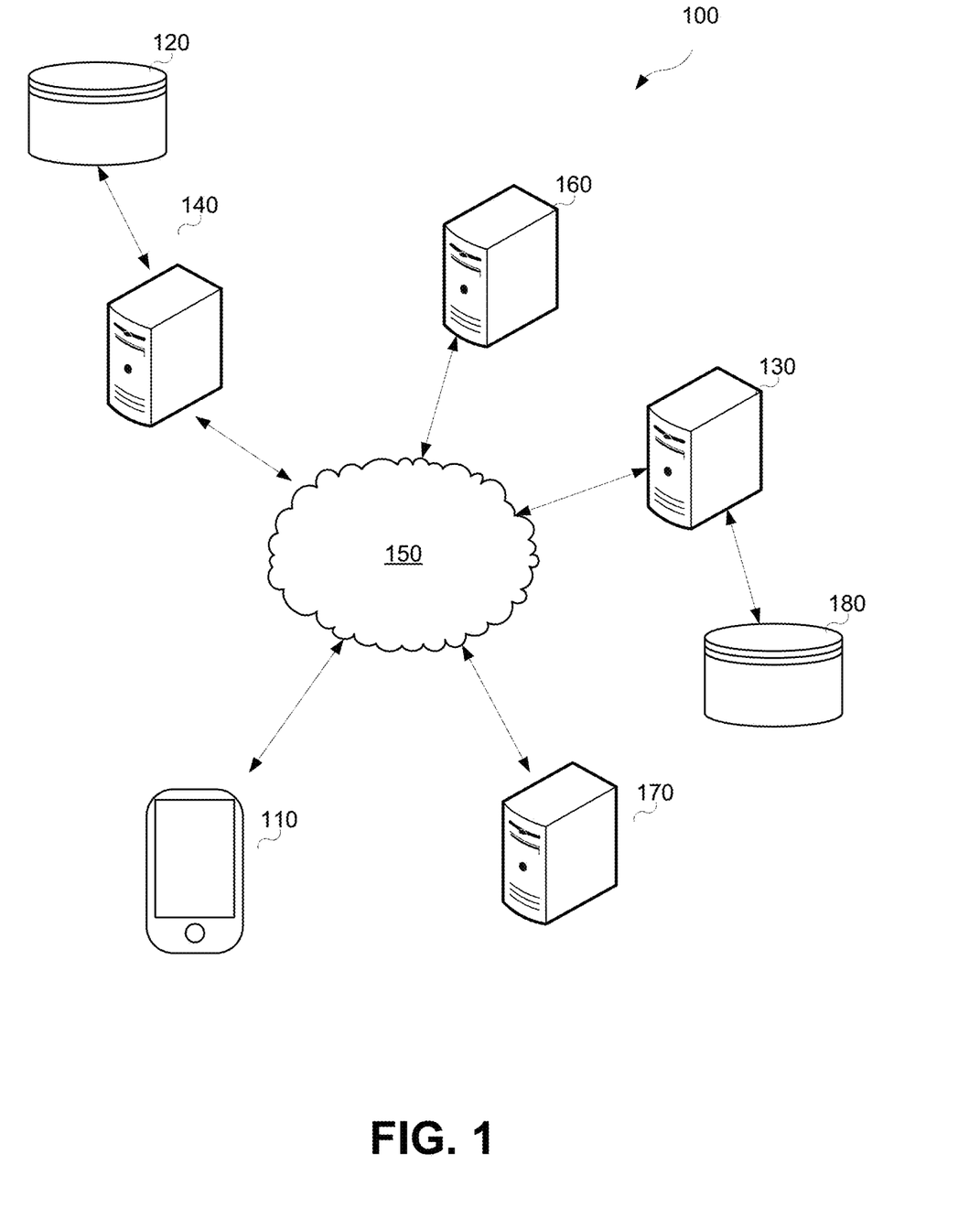
FIG. 1 is a schematic operation diagram illustrating an operating environment of an example embodiment.

FIG. 1 is a block diagram illustrating an operating environment of an example embodiment. Various components cooperate to provide a system 100 which may be used, for example, to perform an operation. As shown, the system 100 includes a transferor device 110, a first database management system 130, a second database management system 140, and a third-party server 170 coupled to one another through a network 150, which may include a public network such as the Internet and/or a private network. The transferor device 110 is a computing device that may be associated with an entity, such as a user or client, having a record in a database associated with and/or provided by the first database management system 130. The record may be or represent account data. The record may include data of various types and the nature of the data will depend on the nature of the first database management system 130.

By way of example, in some implementations, the second database management system 140 may maintain user accounts and a record in the database may be or represent an account. The record may include, for example, documents and/or other data stored by or on behalf of a user. By way of example, in an implementation, a user account may include documents or data uploaded by the user. Such documents and/or data may include, for example, any one or more of: images such as photographs, text-based documents, documents prepared according to a standardized file format, such as portable document format (PDF) documents, user preferences, digital identity data such as stored identity information or documentation, or other types of documents and/or data. For example, in an implementation, the first database management system and/or the second database management system may track, manage, maintain, and/or provide resources to associated entities. The resources may, for example, be computing resources, such as memory or processor cycles. By way of further example, the resources may include stored value, such as fiat currency, which may be represented in a database. For example, the second database management system 140 may be coupled to a second database 120, which may be provided in secure storage. The secure storage may be provided internally within the second database management system 140 or externally. The secure storage may, for example, be provided remotely from the second database management system 140. For example, the secure storage may include one or more data centers. The data centers may, for example, store data with bank-grade security.

The second database 120 may include records associated with a plurality of entities. For example, the records may be for a plurality of accounts and at least some of the records may define a quantity of resources. For example, the entity that is associated with the transferor device 110 may be associated with an account having one or more records in the second database 120. The records may reflect a quantity of stored resources that are associated with the entity. Such resources may include owned resources and, in at least some embodiments, borrowed resources. The resources that are associated with an entity may be grouped into various buckets. Some such buckets may, for example, represent individual bank accounts. For example, an entity may be associated with one or more bank accounts. At least some of the resources may be borrowed resources. The borrowed resources may, for example, represent an amount of credit that is available to the entity. The entity that is associated with the transferor device 110 and the account may be a customer of a financial institution which operates or manages the second database management system 140.

The first database management system 130 and the second database management system 140 may be operated by different entities. That is, the first database management system 130 may be associated with a first system operator and the second database management system 140 may be associated with a second system operator who is different than the first system operator. The first database management system 130 may be, for example, associated with a financial institution server that is associated with a different financial institution than the second database management system 140 and may maintain customer financial accounts. That is, the second database management system 140 may maintain a second database 120 that includes various data records. A data record may, for example, reflect an amount of value stored in a particular account associated with a user.

The first database management system 130 may include or be connected with a first database 180 that operates similar to the second database 120 that is provided by or associated with the second database management system 140.

The first database management system 130 and second database management system 140 may store other data instead of or in addition to financial account data. By way of example, as noted above, in some implementations, the first database management system 130 and the second database management system 140 may manage computing resources such as memory and/or processor cycles which may be used by the transferor device 110. The records may, for example, associate a particular entity with particular computer resources. For example, the records may entitle a particular entity exclusive or shared use of a computing resource. The database management systems 130, 140 may communicate with one another in order to send and receive request to transfer messages that transfer use of a computing resource from a record maintained by the second database management system 140 to a record maintained by the first database management system 130.

In another example, the database management systems 130, 140 may act as cloud-based storage and may store files, such as documents for various entities. The second database management system 140 may, in accordance with instructions received from an entity associated with a document, transfer that document to another entity having a record at the first database management system 130. By way of example, the document may be a media file, such as an electronic book, video file or audio file, having digital rights management (DRM) which only permits the document to be transferred if exclusive use of the document is transferred (i.e., if the transfer is performed such that the transferor is no longer able to use the document after the transfer). The database management systems 130, 140 may communicate with one another in order to transfer the document in accordance with instructions received from the transferor device 110.

The transferor device 110 may take a variety of forms such as a smartphone, a tablet computer, a wearable computer such as a head-mounted display or smartwatch, a laptop or desktop computer, or a computing device of another type. The first database management system 130 and/or the second database management system 140 may be referred to as first and second computing devices respectively and may also be referred to as first and second servers, respectively. The transferor device 110 may be referred to as a client device.

The network 150 is a computer network. In some embodiments, the network 150 may be an internetwork such as may be formed of one or more interconnected computer networks. For example, the network 150 may be or may include an Ethernet network, an asynchronous transfer mode (ATM) network, a wireless network, a telecommunications network, or the like.

The first database management system 130 may be configured to communicate with other servers, such as the second database management system 140 using one or more communication protocols, which may also be referred to as transfer protocols or transfer rails.

In at least some embodiments, a transfer rail server 160 may be configured to facilitate a transfer from a first data record to a second data record according to a first transfer protocol. The first data record may be a data record maintained by the second database management system 140 and the second data record may be a data record maintained by a server associated with a different system operator than the second database management system 140 (e.g., such as the first database management system 130). The transfer rail server 160 may operate as an intermediary between the first database management system 130 and the second database management system 140.

One or more of the transfer protocols may not require the use of a transfer rail server. For example, one or more of the transfer protocols may operate through the exchange of messages directly between the first database management system 130 and the second database management system 140. Such messages may be exchanged through the network 150.

In at least some embodiments, a third-party server 170 may be provided and the third-party server 170 may interact with other components of described herein. An entity that is associated with the third-party server 170 may be associated with an account having one or more records in the second database. In this way, the third-party server 170 may be associated with an account and/or a record in the second database. The records may reflect a quantity of stored resources that are associated with the entity. In at least some embodiments, the third-party server 170 may be configured to operate as an e-commerce server, and may conduct transactions for goods and services over the Internet. As will be described below, the third-party server 170 may be used to initiate a request to separate a transfer into a plurality of parts. For example, a transferor device may access the third-party server 170 during an e-commerce session and the third-party server 170 may provide the transferor device with an interface that may be used to input an instruction to separate a transfer into a plurality of parts. The transferor device may provide the third-party server 170 with account information such as an identity of a database management system and/or database that is associated with the transferor device and information that identifies a particular record in such a database. For example, in one implementation, the transferor device may provide the third-party server with account information for a bank account and it may identify the institution that manages or provides the bank account. This allows the third-party server 170 to ensure that requests to transfer for transfers associated with the transferor device are issued to the proper account. Where the third-party server 170 is an e-commerce server, the account information may be provided at the time of checkout or it may be stored as a preference associated with an account linked to the transferor device at the third party server.

The transferor device 110, the first database management system 130, the second database management system 140, the transfer rail server 160 and the third-party server 170 may be in geographically disparate locations. Put differently, the transferor device 110, the first database management system 130, the second database management system 140, the transfer rail server 160, and the third-party server 170 may be remote from one another.

In some embodiments, the first database management system 130 may be configured to operate as a first database management system and the second database management system 140 may be configured to operate as a second database management system. A database management system may be configured to send and receive a request to transfer. A request to transfer may be a specially formatted message that is sent from a first database management system 130 to a second database management system 140. The request to transfer may be sent from the first database management system 130 to the second database management system 140 over a transfer rail that is used for facilitating transfers between databases associated with different database management systems. For example, the first database management system 130 may be associated with a first database 180 and the second database management system 140 may be associated with a second database 120.

The first and second databases 180, 120 may store account data. That is, the first and second databases 180, 120 may store data that is associated with various accounts. In at least some implementations, each record in the first and second databases 180, 120 may be associated with a particular one of these accounts.

FIG. 1 illustrates an example representation of components of the system 100. The system 100 can, however, be implemented differently than the example of FIG. 1. For example, various components that are illustrated as separate systems in FIG. 1 may be implemented on a common system. By way of further example, the functions of a single component may be divided into multiple components.

Figure 2:
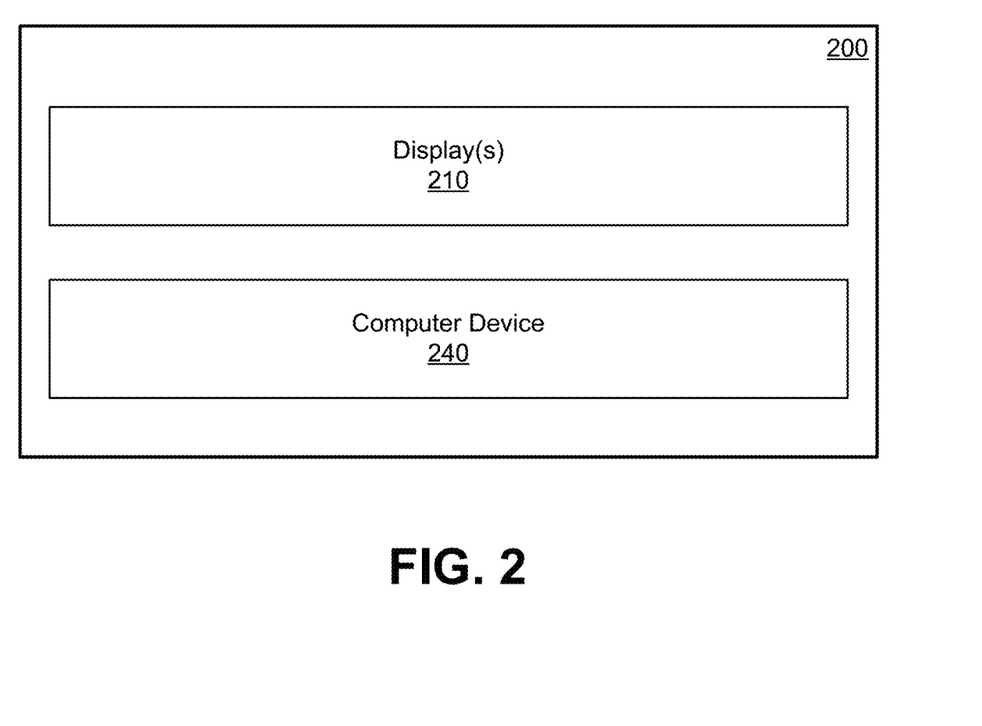
FIG. 2 is a simplified schematic diagram showing components of a computing device.

FIG. 2 is a simplified schematic diagram showing components of an exemplary computing device 200. The transferor device 110 may be of the same type as computing device 200. The computing device 200 may include modules including, as illustrated, for example, one or more displays 210 and a computer device 240.

The one or more displays 210 may be or include a display module. The one or more displays 210 are used to display screens of a graphical user interface that may be used, for example, to communicate with the first database management system 130 (FIG. 1). The one or more displays 210 may be internal displays of the computing device 200 (e.g., disposed within a body of the computing device).

The computer device 240 is in communication with the one or more displays 210. The computer device 240 may be or may include a processor which is coupled to the one or more displays 210.

Figure 3:
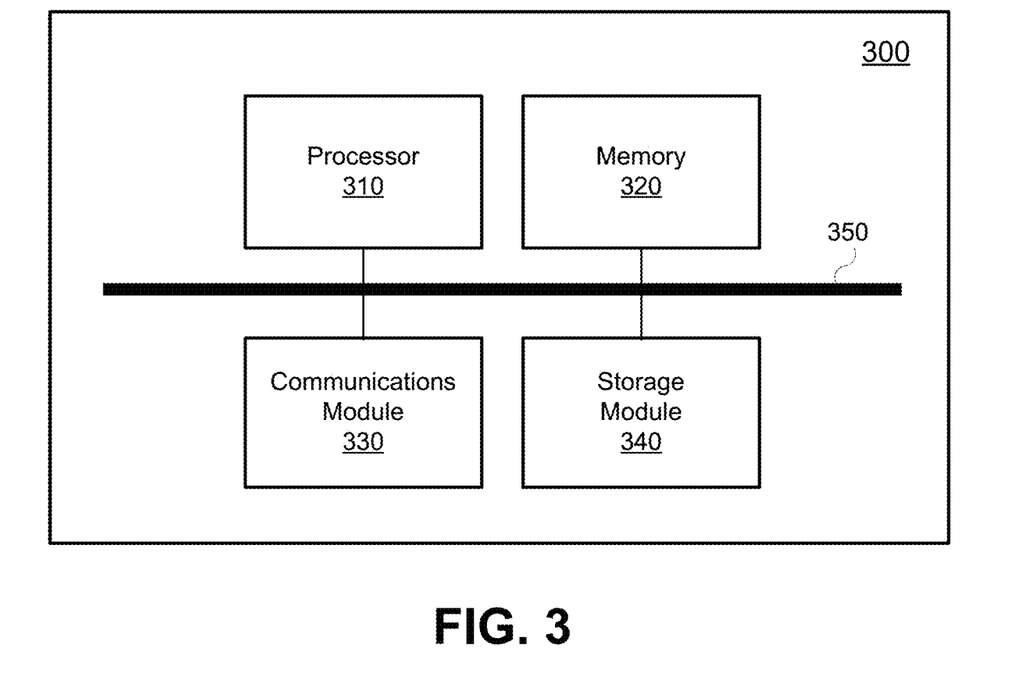
FIG. 3 is a high-level schematic diagram of an example computer device.

Referring now to FIG. 3, a high-level operation diagram of an example computer device 300 is shown. In some embodiments, the computer device 300 may be exemplary of the computer device 240 (FIG. 2), the first database management system 130, the transferor device 110, the third party server 170 and/or the second database management system 140.

The example computer device 300 includes a variety of modules. For example, as illustrated, the example computer device 300 may include a processor 310, a memory 320, a communications module 330, and/or a storage module 340. As illustrated, the foregoing example modules of the example computer device 300 are in communication over a bus 350.

The processor 310 is a hardware processor. The processor 310 may, for example, be one or more ARM, Intel x86, PowerPC processors or the like.

The memory 320 allows data to be stored and retrieved. The memory 320 may include, for example, random access memory, read-only memory, and persistent storage. Persistent storage may be, for example, flash memory, a solid-state drive, or the like. Read-only memory and persistent storage are a non-transitory computer-readable storage medium. A computer-readable medium may be organized using a file system such as may be administered by an operating system governing overall operation of the example computer device 300.

The communications module 330 allows the example computer device 300 to communicate with other computer or computing devices and/or various communications networks. For example, the communications module 330 may allow the example computer device 300 to send or receive communications signals. Communications signals may be sent or received according to one or more protocols or according to one or more standards. For example, the communications module 330 may allow the example computer device 300 to communicate via a cellular data network, such as for example, according to one or more standards such as, for example, Global System for Mobile Communications (GSM), Code Division Multiple Access (CDMA), Evolution Data Optimized (EVDO), Long-term Evolution (LTE) or the like. Additionally or alternatively, the communications module 330 may allow the example computer device 300 to communicate using near-field communication (NFC), via Wi-Fi™, using Bluetooth™ or via some combination of one or more networks or protocols. In some embodiments, all or a portion of the communications module 330 may be integrated into a component of the example computer device 300. For example, the communications module may be integrated into a communications chipset. In some embodiments, the communications module 330 may be omitted such as, for example, if sending and receiving communications is not required in a particular application.

The storage module 340 allows the example computer device 300 to store and retrieve data. In some embodiments, the storage module 340 may be formed as a part of the memory 320 and/or may be used to access all or a portion of the memory 320. Additionally or alternatively, the storage module 340 may be used to store and retrieve data from persisted storage other than the persisted storage (if any) accessible via the memory 320. In some embodiments, the storage module 340 may be used to store and retrieve data in a database. A database may be stored in persisted storage. Additionally or alternatively, the storage module 340 may access data stored remotely such as, for example, as may be accessed using a local area network (LAN), wide area network (WAN), personal area network (PAN), and/or a storage area network (SAN). In some embodiments, the storage module 340 may access data stored remotely using the communications module 330. In some embodiments, the storage module 340 may be omitted and its function may be performed by the memory 320 and/or by the processor 310 in concert with the communications module 330 such as, for example, if data is stored remotely. The storage module may also be referred to as a data store.

Where the example computer device 300 functions as the first database management system 130 of FIG. 1, the storage module 340 may allow the example computing device 300 to access the secure data in the first database 180. Likewise, where the example computer device 300 functions as the second database management system 140 of FIG. 1, the storage module 340 may allow the example computing device 300 to access the secure data in the second database 120.

Software comprising instructions is executed by the processor 310 from a computer-readable medium. For example, software may be loaded into random-access memory from persistent storage of the memory 320. Additionally or alternatively, instructions may be executed by the processor 310 directly from read-only memory of the memory 320.

Figure 4:
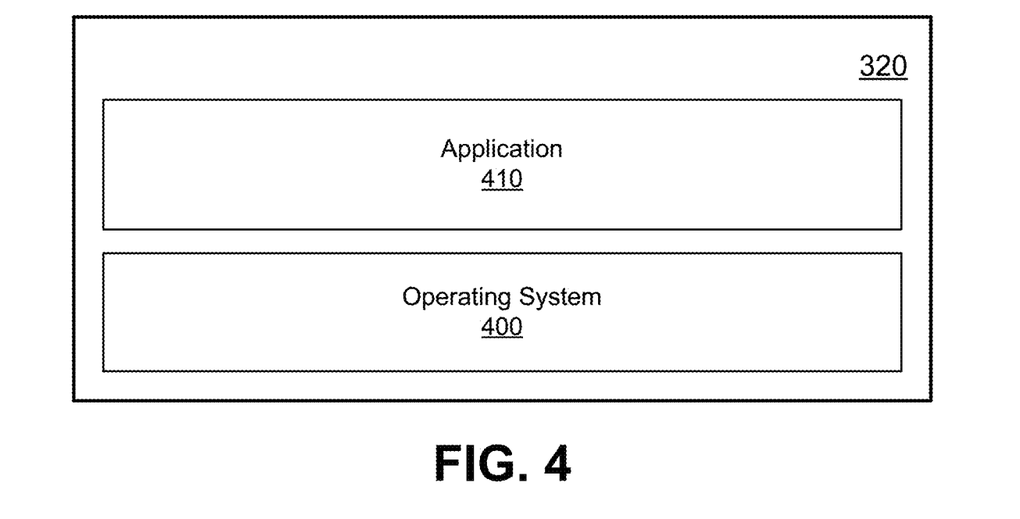
FIG. 4 shows a simplified organization of software components stored in a memory of the example computer device of FIG. 3.

FIG. 4 depicts a simplified organization of software components stored in the memory 320 of the example computer device 300 (FIG. 3). As illustrated, these software components include an operating system 400 and an application 410.

The operating system 400 is software. The operating system 400 allows the application 410 to access the processor 310 (FIG. 3), the memory 320, and the communications module 330 of the example computer device 300 (FIG. 3). The operating system 400 may be, for example, Google™ Android™, Apple™ iOS™, UNIX™, Linux™, Microsoft™ Windows™, Apple OSX™ or the like.

The application 410 adapts the example computer device 300, in combination with the operating system 400, to operate as a device performing a particular function. For example, the application 410 may cooperate with the operating system 400 to adapt a suitable embodiment of the example computer device 300 to operate as the computer device 240 (FIG. 2), the first database management system 130, and/or the second database management system 140.

While a single application 410 is illustrated in FIG. 3, in operation the memory 320 may include more than one application 410 and different applications 410 may perform different operations. For example, in at least some embodiments in which the computer device 300 is functioning as the transferor device 110, the applications 410 may include a transfer initiation application. The transfer initiation application may be configured for secure communications with the first database management system 130 and may provide various functions such as, for example, the ability to display data in a record in the first database 180. In some implementations, the transfer initiation application may be a banking application which may, for example, be configured to display a quantum of value in one or more data records (e.g., display balances), configure or request that operations such as transfers of value (e.g., bill payments, email money transfers and other transfers) be performed, and perform other account management functions.

By way of further example, in at least some embodiments in which the computer device 300 functions as the transferor device 110, the applications 410 may include a web browser, which may also be referred to as an Internet browser. In at least some such embodiments, the first database management system 130 may be or include a web server that may serve one or more of the interfaces described herein. The web server may cooperate with the web browser and may serve as an interface when the interface is requested through the web browser. For example, the web browser may serve as a mobile banking interface. The mobile banking interface may provide various banking functions such as, for example, the ability to display a quantum of value in one or more data records (e.g., display balances), configure or request that operations such as transfers of value (e.g., bill payments and other transfers) be performed, and other account management functions.

The first database management system 130 and/or the second database management system 140 may be configured to receive and complete request to transfer messages. A request to transfer is a message that is sent on behalf of a recipient to initiate a transfer from a sender, i.e., a transferor, to the recipient. That is, the request to transfer is sent, on behalf of the recipient, from the database management system associated with the recipient (e.g. the first database management system 130) to the database management system associated with the sender (e.g. the second database management system 140). The request to transfer requests a transfer from a record in the database that is associated with the sender (e.g., in the second database 120) to a record in the database that is associated with the recipient (e.g., in the first database 180). The request to transfer includes one or more identifiers that identify the record associated with the sender and/or the record associated with the recipient. The identifier(s) may be or include an account number. The request to transfer may also include one or more identifiers that identify the second database management system 140 associated with the sender and/or that identify the first database management system 130 associated with the recipient. Such identifiers may be or include one or more of: a transit number and an institution number.

The request to transfer is a transfer initiation message. That is, the request to transfer is an initial message that may be used to cause a transfer to occur. Since the request to transfer is initiated by a recipient rather than a sender, the request to transfer may be considered a pull-style transfer, which may be contrasted with typical push-style transfers. In at least some implementations, the request to transfer may be formatted as an ISO20022 message.

The request to transfer message is specially formatted to include parameters of a transfer that is requested to be made from a sender. The parameters may be included as metadata in the transfer message. Where the request to transfer is an ISO20022 message, the parameters may be included in an ISO20022 format. The parameters may include resource definition data. The resource definition data defines what is requested to be transferred. By way of example, the resource definition data may define a resource that is stored in or otherwise associated with a record associated with the sender. The resource may be, for example, a computing resource. In another implementation, the resource may be data. In some implementations, the resource may represent an amount of value, such as a quantity of a currency.

The parameters that are included in the request to transfer may include data of another type. For example, in some implementations, the parameters may be or include transfer scheduling data. The transfer scheduling data may represent a time when the requested transfer is to be made. This time may be, for example, a due date or deadline. The due date or deadline represents a latest time at which the transfer is to be made.

The request to transfer message may, in some implementations, be or represent a request for payment. Such a message may be referred to as a request for payment (RFP) message or a request to pay (RTP) message. In such implementations, the transfer rail may be a payment rail such as a real time payment rail and the database management systems may be a financial institution system. In at least some such implementations, the records may represent bank accounts and a transfer may be a request to transfer value from a sender bank account to the recipient bank account. The request to transfer message may be sent from a first financial institution system, which is associated with a first financial institution, to a second financial institution system, which is associated with a second financial institution.

The request to transfer message is a special transfer message which is not formatted as an email or short message service (SMS) message. Rather, it is a computer-to-computer message that is formatted to be specially processed by the database management system that receives it. In at least some implementations, the computer-to-computer message may be formatted according to the ISO20022 standard. For example, the first database management system 130 that receives the request to transfer message may be configured to execute a process for obtaining authorization to complete a transfer in response to receiving the request to transfer. More particularly, the database management systems may be configured to only permit authorized transfers. For example, in one implementation, the second database 120 stores account data for a plurality of accounts and a database management system will only allow a transfer out of an account if the transfer is authorized by an authorization entity for that account, such as an accountholder. Authorization may, for example, require authenticated approval using a credential such as one or more of a username, password, biometric authentication data or other credential.

In one implementation, in response to receiving the request to transfer message, a database management system (such as the second database management system 140) may identify an affected account using an identifier defined by the transfer message. Then, this database management system may send an electronic notification to a transferor device 110 associated with the identified account. This notification may be provided as an in-application notification or operating system level notification. The notification may include a selectable option to authorize the transfer.

The notification may allow the transfer to be made without requiring input of one or more parameters that are typically required when a transfer is initiated by the sender rather than the recipient. By way of example, one or more parameters that are included in the request to transfer may be used to pre-stage or pre-populate parameters of the transfer so that the sender does not have to input such parameters. In some implementations, the resource definition data included in the request to transfer may be used to allow the transfer to be made without having the sender define what is to be transferred. For example, where the transfer is a transfer of a computing resource or data, the sender may perform the transfer without having to input any information defining the computing resource or data involved. Or, where the transfer is a transfer of an amount of value, the amount of value defined in the request for transfer message may be used so that the sender does not have to define the amount of value.

In some implementations, transfer scheduling data included in the request to transfer message may be used to schedule the transfer without requiring the sender to define such a schedule. For example, where the transfer scheduling data is a due date or deadline, the database management system associated with the sender may automatically define a time for a transfer based on the transfer scheduling data without requiring the sender to input such a time.

In this way, the sender may cause a second database management system 140 that is associated with the sender's record in a second database 120 to perform the transfer without having to input any parameters for the transfer. The time and/or amount of the transfer may be extracted directly from the request to transfer message. The sender may only need to input an indication of consent to initiate the transfer when the sender has authenticated to the second database management system 140 and the transfer may then be performed.

Optionally, in some implementations, the database management system (such as the second database management system 140) may process the request to transfer by using the parameters defined in the request to transfer as default parameters for a pre-staged transfer which can be overridden through input of alternative parameters by the sender.

Figure 5:
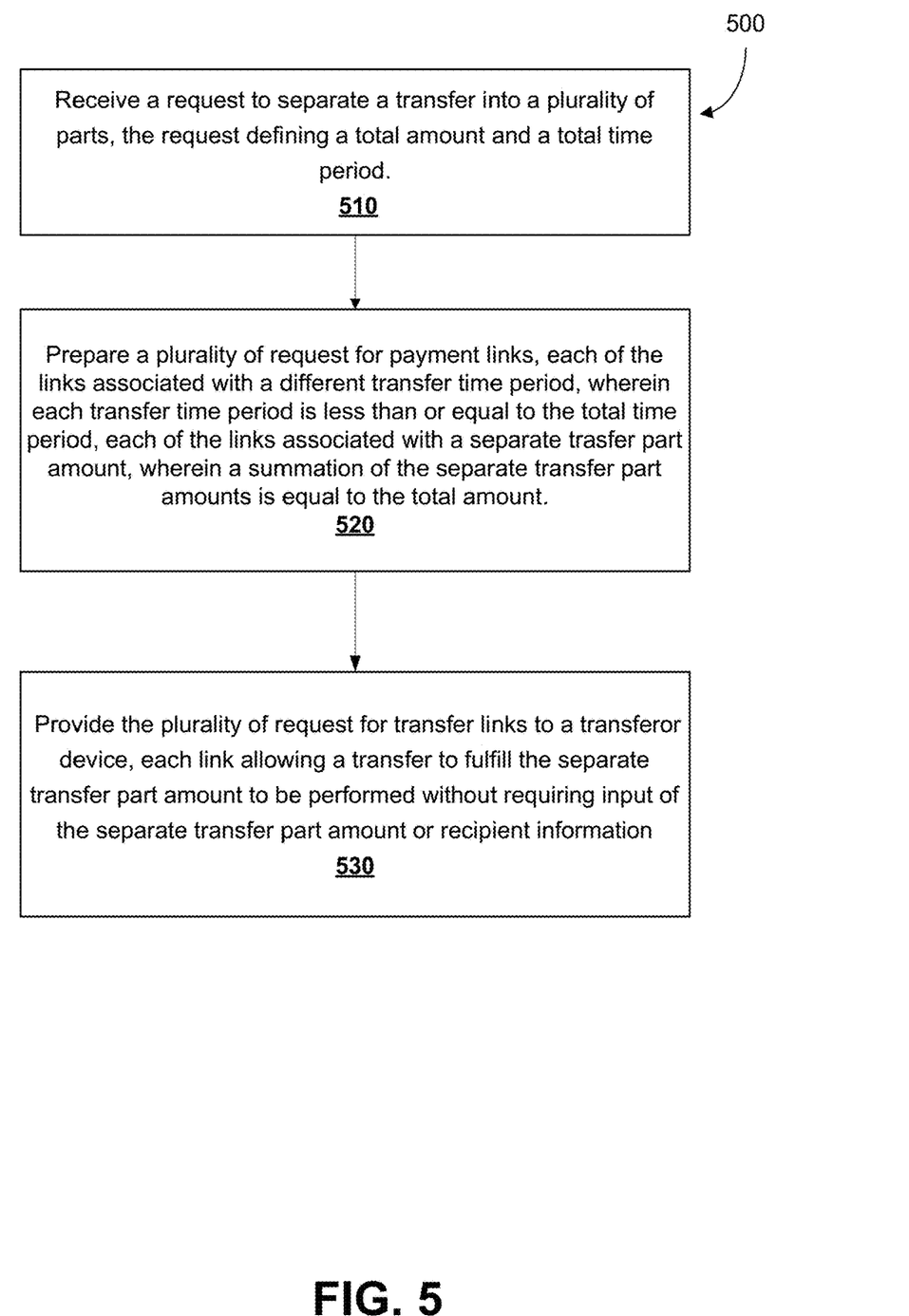
FIG. 5 shows a flowchart showing operations performed by a first database management system in completing a data transfer according to an embodiment.

Reference will now be made to FIG. 5, which is a flowchart showing operations performed by the first database management system 130 or another suitable system in preparing and providing a plurality of transfer links. The operations may be included in a method 500 which may be performed by the first database management system 130. For example, computer-executable instructions stored in memory of the first database management system 130 may, when executed by one or more processors, configure the first database management system 130 to perform the method 500 or a portion thereof.

At operation 510, the first database management system 130 receives a request to separate a transfer into a plurality of parts. The request may be received, for example, from another computing system such as a third-party server 170. The request to separate the transfer may be initiated through an electronic message sent from the third-party server 170 to the transferor device 110. The electronic message may be associated with a transaction between the entity associated with the transferor device 110 and the entity associated with the third-party server 170.

In some embodiments, the request may be associated with a document, such as an invoice. In some embodiments, the request is received after to sending the associated document. The associated document may indicate a total amount, a due date, such as a final transfer due date, transferor information and recipient information. The document may, for example, be sent to a transferor device.

The request may define a total amount to be transferred and a total time period. The total time period may be, for example, a time in the range of 0-24 months in some implementations. The request may define a due date, such as a final transfer due date. The total amount may correspond to an amount of an associated document, such as an associated invoice. That is, the total amount may be an invoiced amount.

The request may be received by the first database management system 130 from another system, such as a third party server 170 over network 150. The request may be received in response to receiving a document, such as an invoice. In some embodiments, the first database management system 130 or another system such as the third party server 170 may send a document to the transferor. The document may include a selectable option to request separation of the transfer into a plurality of parts. By way of example, the document may include a link which, when activated, causes a device displaying the link to send the request to separate the transfer into a plurality of parts to the first database management system 130 (or another system performing the method 500). As noted above, in at least some implementations, the document is an invoice and the invoice may include the selectable option to request separation of the transfer into a plurality of parts.

Accordingly, in some embodiments related to a request for transfer from a transferor account to a recipient account, a document, for example, an invoice, may be provided to a transferor device 110. The transferor device 110 is a computing device that may be associated with an entity, such as a user or client, having a record in a database associated with and/or provided by the second database management system 140. The record may be or represent account data. The record may include data of various types and the nature of the data will depend on the nature of the database management system. The transferor device 110 may take a variety of forms such as a smartphone, a tablet computer, a wearable computer such as a head-mounted display or smartwatch, a laptop or desktop computer, or a computing device of another type. In some embodiments, the request to transfer may be a request to transfer value from a transferor account to a recipient account.

The document may include a selectable option to spread out the total amount of the transfer over time. In other words, the selectable option may include an option to define the total time period. Selecting the option to spread out the transfers may initiate a request, from the second database management system 140 to the first database management system 130, to separate a transfer into a plurality of parts.

In some embodiments, the selectable option provided by the first database management system 130 may include an option to define the total time period over which the plurality of transfers may be made. For example, a transferor may wish to spread out the transfers over a three-month period or over a six-month period. In some embodiments, the option to define the total time period may be limited (for example, 3-24 months).

In some embodiments, the selectable option may be a selectable option to request approval to separate the transfer into a plurality of parts, for example, to validate the request to spread out the transfer of a total amount of data over time. Selection of such an option may cause a notification to be sent from the transferor to the recipient to request approval, i.e., to validate the request to separate a transfer into a plurality of parts. In at least some implementations, the recipient may be associated with the third party server 170 and the notification to request approval to separate the transfer into a plurality of parts may be sent to the third party server 170. The notification may define a time period and/or number of transfers requested by the transferor, (for example, a request to split a transfer of 120 units into six transfers over six months). Upon validation, the first database management system 130 may prepare and provide a plurality of request for transfer links to the second database management system 140.

Figure 6:
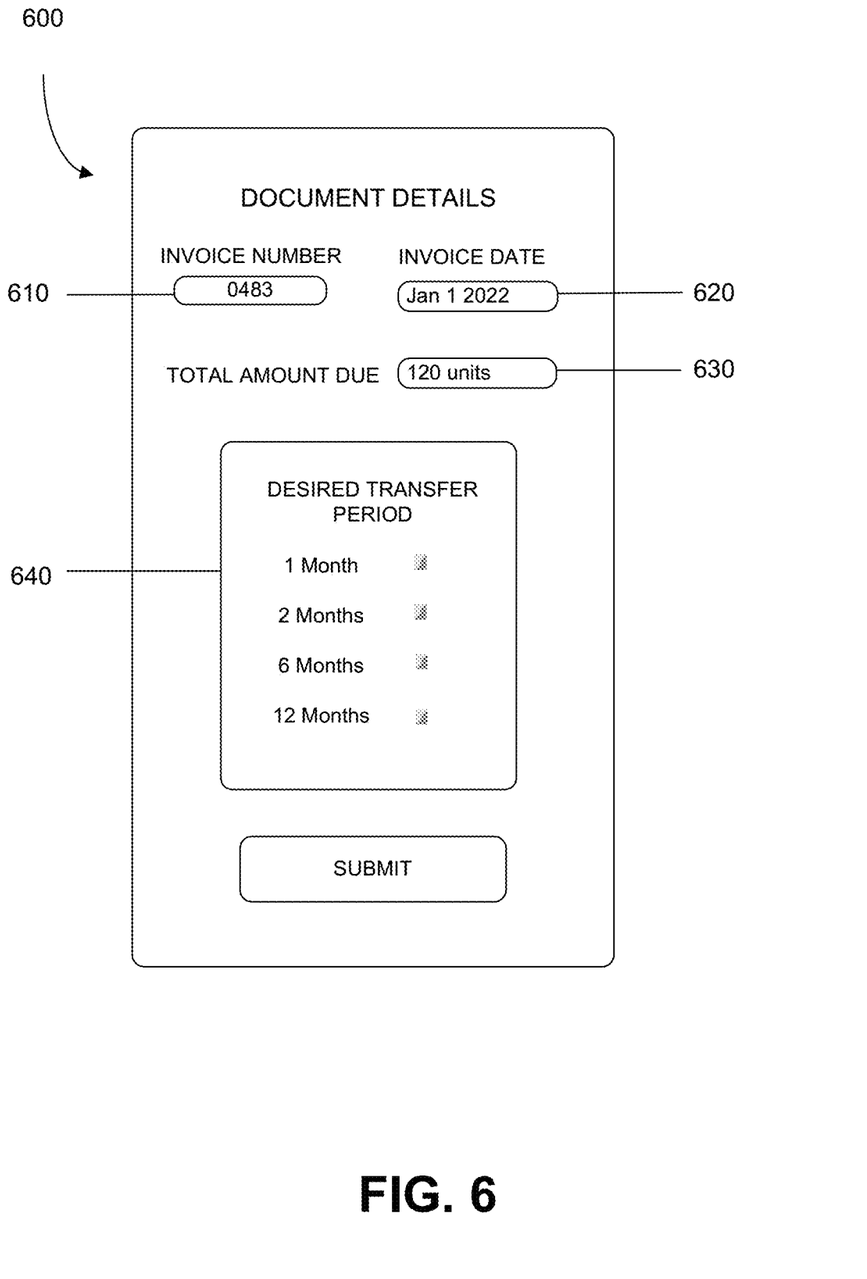
FIG. 6 is an example interface showing an invoice, according to an embodiment.

Referring now to FIG. 6, document 600 is shown as displayed on the transferor device 110 in accordance with one aspect of the present application. The document 600 includes an invoice number 610, an invoice date 620, ("Jan. 1, 2022"), a total amount due 630, ("120 units"), and a selectable option 640 to choose a "Desired Transfer Period." The selectable option 640 includes the options of 1 month, 2 months, 6 months, and 12 months. It will be understood that the selectable option 640 to choose a total time period is not limited to the illustrated total time period options. The selectable option 640 may include total time period options that are a variety of different lengths and may include total time periods that are longer and/or shorter than those illustrated. The selectable option 640 may include an option to define the total time period. For example, the selectable option may include an option to forgo a separation of the transfer into a plurality of parts, i.e., an option to transfer the total amount at one time. With respect to the document 600, selecting the option of "one month" may effect a request to transfer the total amount within a one-month time period. Selecting this option may effect the generation, by the first database management system 130, of a request for transfer link in connection with the total amount, 120.00 units and a due date of Feb. 1, 2022 (one month from the document date of Jan. 1, 2022). Additionally or alternatively, the selectable option may include an explicit option to "Transfer in Full". Additionally or alternatively, selecting any option other than transfer of the total amount at once may initiate a request to validate the request to separate the transfer into a plurality of parts. The request to validate may be sent from the transferor device 110 to the first database management system 130. In some embodiments, the request to validate may include a credit check in connection with the transferor. In some embodiments, upon validation, the first database management system 130 may automatically prepare and provide a plurality of request for transfer links to the transferor device 110 without requiring any further information from the transferor device 110. In some embodiments, the request to transfer may be a request to transfer value from a transferor account to a recipient account.

Returning to FIG. 5, at operation 520, the first database management system 130 prepares a plurality of request for transfer links. The request for transfer links, when executed, may redirect a user to a request for transfer message. A request for transfer link may be executed, for example, when a user clicks on the link. The number of request for transfer links and the parameters of the request for transfer may be associated with the total amount, the due date, and the total time period defined by the request to separate the transfer into a plurality of parts. For example, a request to separate the transfer into a plurality of parts may correspond to a total amount of 120 units, a due date of Jan. 1, 2022, and a time period of four months.

A frequency of transfer value may be determined by the first database management system 130 and/or the second database management system 140 and/or may be included in the parameters of the request for transfer. A frequency of transfer may be, for example, every two weeks or every one month. The frequency of transfer value may be used by the first database management system 130 to determine a number of transfers. For example, a frequency of transfer value may be one month. A total time period, t, of six months divided by a frequency transfer value f, of one month yields a number of transfer parts, n, of six.

$$\frac{t}{f} = n; \frac{6}{1} = 6$$

As a result, the first database management system 130 may interpret a separate transfer part amount for each for each of the number of transfer parts n. The separate transfer part amounts may be equal in value, or they may be unequal in value. In some embodiments, some of the separate transfer part amounts may be equal and some of the separate transfer part amounts may be unequal. In some embodiments, the summation of the separate transfer part amounts may be equal to the total amount.

For example, in some embodiments, the separate part amounts may be equal. Given a total transfer amount, A, of 120 units, and a number of transfer parts n of 6, the first database management system 130 may determine six separate transfer parts of $20.00.

$$\frac{A}{n} = s; \frac{120.00}{6} = 20$$

A frequency of transfer value, described above, is a number, for example, 1. A frequency of transfer may describe the number with respect to a frequency, for example "of one month". Each of the plurality of separate transfer parts may be associated with a different transfer time period, each transfer time period being less than or equal to the total time period. For example, the first database management system 130 may determine to separate a transfer into six separate transfer parts of 20 units each; the separate transfers being associated with separate due dates which are one month apart.

Figure 7:
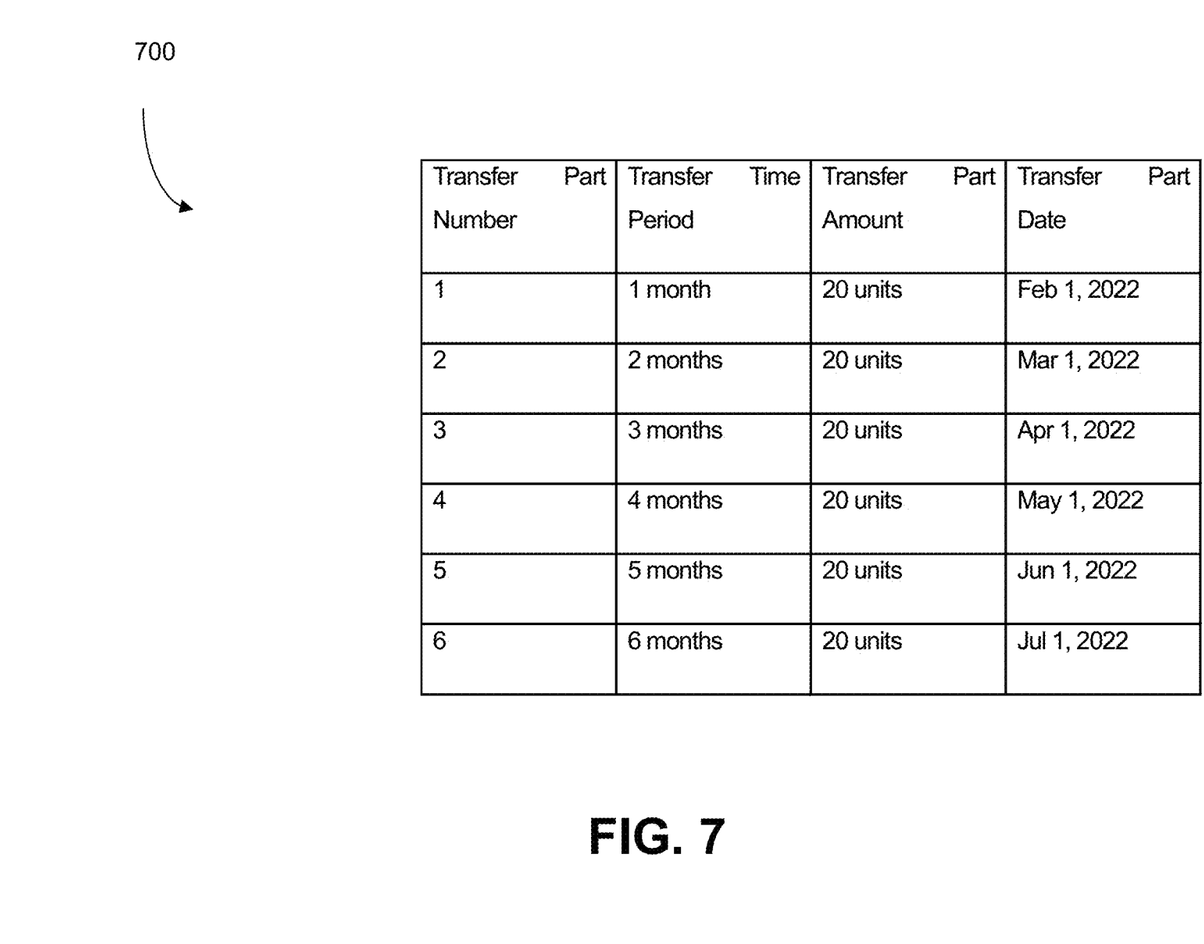
FIG. 7 is a table of values, according to an embodiment.

FIG. 7 illustrates a table 700 in accordance with an example embodiment of a request to separate a transfer of 120 units The transfer is associated with a due date of Jan. 1, 2022, a six-month total time period, a final transfer due date of Jul. 1, 2022, a frequency of transfer value of one month, and equal separate transfer part amounts. As illustrated in the table 700, each separate transfer part is associated with a different transfer time period, and each transfer time period is less than or equal to the total time period. In this example, the separate transfer part amounts are equal, however embodiments are not limited to this implementation.

In an example embodiment associated with table 700, in response to receiving a request to separate a transfer of 120 units into a plurality of parts, the request defining a total time period of six months, the first database management system 130 prepares a plurality (i.e., six) request for transfer links. Each of the links may be associated with a different transfer time period (in this example, from one month after Jan. 1, 2022, to six months after Jan. 1, 2022, at one-month intervals). In this example embodiment, each of the links are associated with a separate transfer part amount of 20 units, and a summation of the separate transfer part amounts is equal to the total amount of $120.00.

In the example above, the separate transfer part amounts are equal. However, in some embodiments, some or all of the separate transfer part amounts may be unequal. For example, given a total amount of 120 units and a total time period of six months, the separate part amounts may be equal to 30 units, 25 units, 20 units, 15 units, 15 units, 10 units, and 5 units. Alternatively, the separate part amounts may be equal to 35 units, 30 units, 25 units, 20 units, 7.5 units, and 2.5 units.

At step 530, the first database management system 130 provides the request for transfer links to a transferor. Each link allows the transferor to submit a transfer to fulfill the part amount for a separate part of the total amount without having to input the part amount or recipient information. The links may be provided to the transferor device 110 in multiple ways. In an embodiment, the links first may be provided as an electronic message sent from the first database management system 130 to the second database management system 140. The second database management system 140 may then provide the links as an electronic message to the transferor device 110. Alternatively, the first database management system 130 may provide the links as an electronic message to the transferor device 110, without first sending the electronic message to the second database management system 140. The request for transfer links may be request to transfers as described above. For example, these links may be sent as specially formatted computer-to-computer notifications.

The plurality of request for transfer links may be provided to the transferor device 110 all at once. Alternatively, the plurality of request for transfer links may be provided to the transferor device at scheduled times. For example, the first database management system 130 may schedule the sending of the plurality of request for transfer links such that the links will only be sent at or near their associated due dates. For example, in connection with a transfer due March 31, a request for transfer link may be sent one month earlier, on March 1. Additionally or alternatively, a request for transfer link may be sent, for example, on March 15 or March 17. Additionally or alternatively, a request for transfer link may be sent, for example, one week earlier, on March 24. In some embodiments, each link allows a transfer to fulfill the separate transfer part amount without requiring input of the separate transfer part amount or recipient information.

Figure 8:
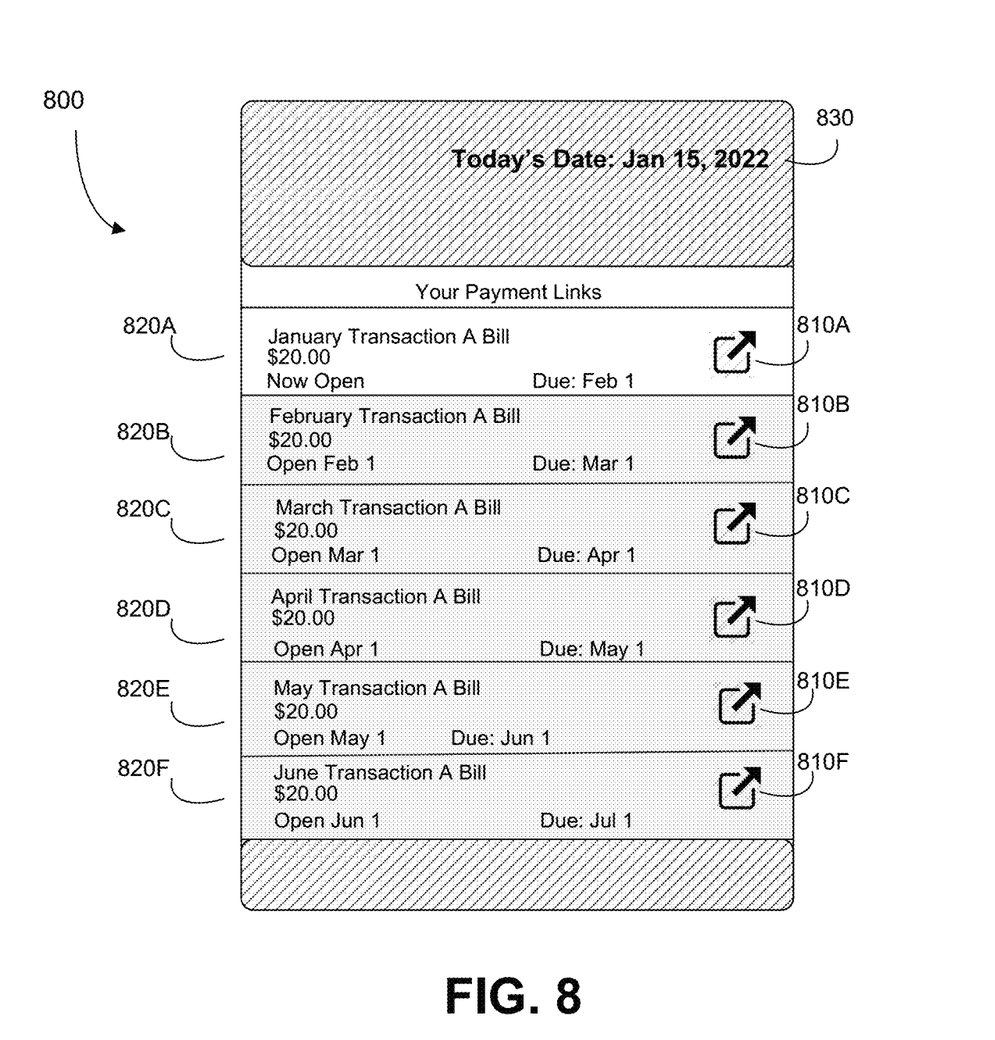
FIG. 8 is an example interface showing a plurality of request for transfer links, according to an embodiment.

Referring now to FIG. 8, an example interface 800 to a transferor device 110 is shown. The example interface 800 may display information relating to the request for transfer links such, for example, the request for transfer links themselves, the associated transfer part amounts, the associated due dates, and the associated link effectiveness terms.

A link effectiveness term may refer to the period of time during which a link is executable. For example, a link may only be valid during a transfer window that is associated with the link. For example, example interface 800 shows six transfer links 810A-F, each link having a link effectiveness term of one month. Example interface 800 may relate to an associated document, (e.g., an invoice) having a due date of Jan. 1, 2022. Each link 810A-F is displayed in connection with a description 820A-F of the associated request for transfer. The description 820A-F may include a reference to the transaction (e.g., "Transaction A"), the transfer part amount (e.g., $20.00), and information about the link effectiveness term. For example, description 820B indicates that the link will open on Feb. 1, 2022, ("Open Feb 1"), and that the associated transfer part is due on Mar. 1, 2022, ("Due: Mar 1"). The description 820B indicates that the link effectiveness term is one month between Feb. 1, 2022, and Mar. 1, 2022. As a result, the link 810B will not be enabled for execution before Feb. 1, 2022. After March 1, the link 810B may or may not expire. The descriptions 820C-F contain corresponding information related to a one moth link effectiveness term. Description 820A indicates a due date of one month. Consistent with a one-month link effectiveness term, description 820A indicates that the associated link 810A is currently valid, ("Now Open"), reflective of the current date 830, Jan. 15, 2022, ("Today's Date: January 15, 2022").

In some embodiments, all links 810A-F may be executable upon receipt by the transferor device 110. In such embodiments, the associated descriptions 820A-F may indicate that the associated links are "Now Open". In some embodiments, one or more of the transfer links may be executable upon receipt by the transferor device 110 and one or more of the transfer links may not be executable upon receipt by the transferor device 110. In some embodiments, the link effectiveness terms may vary among the plurality of request for transfer links associated with a request to separate a transfer into a plurality of parts.

FIG. 8 illustrates an example interface in connection with an instance wherein all of the plurality of request for transfer links are provided to the transferor device at the same time, i.e., at once. Doing so may provide for the ability to execute one or more transfers prior to their respective due dates. In an embodiment, providing all of the links at once may allow for the pre-transfer of one or more amounts. For example, a transfer that is due on Jun. 1, 2022, may be paid sometime in March 2022, as the transferor may have the necessary units and may find it convenient to pay in March. In some instances, the first database management system 130 may schedule the sending of the plurality of request for transfer links such that the links will be sent at different times. For example, the first database management system 130 may schedule the sending of the plurality of request for transfer links such that the links will only be sent at or near their associated due dates. For example, a link having a due date sometime in March may be provided on March 1 of the same year. Additionally or alternatively, a request for transfer link may be sent, for example, on March 15 or March 17. Additionally or alternatively, a request for transfer link may be sent, for example, one week earlier, on March 24. In some embodiments, each link allows a transfer to fulfill the separate transfer part amount without requiring input of the separate transfer part amount or recipient information. In some embodiments, upon receipt of one or more transfers associated with the plurality of transfer links, the received transfers may be reconciled with an associated document, e.g., an associated invoice.

In some implementations, each link may be provided on an associated document, for example, an associated invoice.

As previously described, a request for transfer requests a transfer from a record in a database that is associated with the sender, e.g., the transferor, to a record in the database that is associated with the recipient. In one implementation, in response to receiving the transfer message, the first database management system 130 may identify an affected account using an identifier defined by the transfer message. Then, the first database management system 130 may send an electronic notification to a transferor device 110 associated with the identified account. This notification may be provided as an in-application notification or operating system level notification. The notification may include a selectable option to authorize the transfer.

Notably, the notification may allow the transfer to be made without requiring input of one or more parameters that are typically required when a transfer is initiated by the transferor rather than the recipient. By way of example, one or more parameters that are included in the request to transfer may be used to pre-stage or pre-populate parameters of the transfer so that the sender does not have to input such parameters. In some implementations, the resource definition data included in the request to transfer may be used to allow the transfer to be made without having the transferor define what is to be transferred. For example, where the transfer is a transfer of a computing resource or data, the sender may perform the transfer without having to input any information defining the computing resource or data involved. Or, where the transfer is a transfer of an amount of value, the amount of value defined in the request for transfer message may be used so that the sender does not have to define the amount of value.

In some implementations, the first database management system 130 may auto-reconcile documents, for example invoices, with transfers, for example, payments. In an embodiment, when a transfer occurs, the first database management system 130 may mark an associated document as having completed transfer. In some embodiments, a document in connection with a total transfer amount may be split into multiple subdocuments associated with each separate transfer part amount. In such instances, each request for transfer of a separate part amount may reference an original document number in order to facilitate reconciliation. In an embodiment, a memo field associated with an email money transfer style request for payment/request to transfer may be used for this purpose. In this way, auto-reconciliation for a split invoice may be provided.

Referring back to FIG. 5, at step 530, the first database management system 130 provides the plurality of request for transfer links to the transferor device 110. As previously described, FIG. 7 illustrates, in accordance with one embodiment, an example interface to a transferor device in this regard. The first database management system 130 provides the plurality of request for transfer links in such a manner that each link allows a transfer to fulfill a separate transfer part amount to be performed without requiring input of the separate transfer part amount or recipient information. Often, when attempting to pay an invoice online, a transferor may be required to remember, locate and/or enter the associated payment amount, the recipient bank name, the recipient bank account number, and various other information about the transfer. The fulfillment ability provided by the present application is simple for a transferor, as he or she is not required to remember, locate and/or enter the transfer part amount or the recipient information. The fulfillment ability provided by the present application is also advantageous to the recipient, as it may provide for faster payment times due to ease of use by the transferor.

Example embodiments of the present application are not limited to any particular operating system, system architecture, mobile device architecture, server architecture, or computer programming language.

It will be understood that the applications, modules, routines, processes, threads, or other software components implementing the described method/process may be realized using standard computer programming techniques and languages. The present application is not limited to particular processors, computer languages, computer programming conventions, data structures, or other such implementation details. Those skilled in the art will recognize that the described processes may be implemented as a part of computer-executable code stored in volatile or non-volatile memory, as part of an application-specific integrated chip (ASIC), etc.

As noted, certain adaptations and modifications of the described embodiments can be made. Therefore, the above discussed embodiments are considered to be illustrative and not restrictive.

What is claimed is:

1. A computing system comprising:
a communications module;
a processor coupled to the communications module; and
a memory coupled to the processor storing instructions that, when executed by the computing system, cause the computing system to:
send a document to a transferor device, the document including a selectable option to request separation of a transfer into a plurality of transfer time periods;
receive a request to separate the transfer into the plurality of transfer time periods, the request defining a total amount and a total time period, and wherein the transfer is associated with the document;
prepare a plurality of request for transfer links, each of the links associated with a different transfer time period, wherein each transfer time period is less than or equal to the total time period, each of the links associated with a separate transfer part amount, wherein a summation of the separate transfer part amounts is equal to the total amount;
provide the plurality of request for transfer links displayed on an interface to the transferor device, each link allowing a transfer to fulfill the separate transfer part amount to be performed without requiring input of the separate transfer part amount or recipient information; and
receive, from the transferor device, at least one transfer associated with one of the plurality of request for transfer links;
associate the at least one transfer with the document; and
in response to receiving all the transfers associated with the plurality of request for transfer links, reconcile the transfers with the document.

2. The computing system of claim 1, wherein the separate transfer part amounts are equal.

3. The computing system of claim 1, wherein each of the request for transfer links is only valid during the transfer time period associated with the request for transfer link.

4. The computing system of claim 3, wherein the total time period is determined based on a final transfer due date included in the request.

5. The computing system of claim 1, wherein the plurality of request for transfer links are provided to the transferor device at once.

6. The computing system of claim 1, wherein the plurality of request for transfer links are provided to the transferor device at scheduled times.

7. The computing system of claim 6, wherein each of the plurality of request for transfer links are sent to the transferor device at or near an end of the different transfer time period associated with the request for transfer link.

8. The computing system of claim 1, wherein the request to transfer is a request to transfer value from a transferor account to a recipient account.

9. The computing system of claim 1, wherein the selectable option includes an option to define the total time period.

10. The computing system of claim 1, wherein prior to preparing a plurality of request for transfer links, the instructions, when executed by the computing system, further cause the computing system to:
validate the request to separate the transfer into the plurality of transfer time periods.

11. A computer-implemented method, comprising:
sending a document to a transferor device, the document including a selectable option to request separation of a transfer into a plurality of transfer time periods;
receiving a request to separate the transfer into the plurality of transfer time periods, the request defining a total amount and a total time period, and wherein the transfer is associated with the document;
preparing a plurality of request for transfer links, each of the links associated with a different transfer time period, wherein each transfer time period is less than or equal to the total time period, each of the links associated with a separate transfer part amount, wherein a summation of the separate transfer part amounts is equal to the total amount;
providing the plurality of request for transfer links displayed on an interface to the transferor device, each link allowing a transfer to fulfill the separate transfer part amount to be performed without requiring input of the separate transfer part amount or recipient information;
receiving, from the transferor device, at least one transfer associated with one of the plurality of request for transfer links;
associating the at least one transfer with the document; and
in responding to receiving all the transfers associated with the plurality of request for transfer links, reconcile the transfers with the document.

12. The computer-implemented method of claim 11, wherein the separate transfer part amounts are equal.

13. The computer-implemented method of claim 11, wherein each of the request for transfer links is only valid during the transfer time period associated with the request for transfer link.

14. The computer-implemented method of claim 13, wherein the total time period is determined based on a final transfer due date included in the request.

15. The computer-implemented method of claim 11, wherein the plurality of request for transfer links are provided to the transferor device at once.

16. The computer-implemented method of claim 11, wherein the plurality of request for transfer links are provided to the transferor device at scheduled times.

17. The computer-implemented method of claim 16, wherein each of the plurality of request for transfer links are sent to the transferor device at or near an end of the different transfer time period associated with the request for transfer link.

18. A non-transitory computer-readable storage medium storing instructions that when executed by a processor of a computing system cause the computing system to:
send a document to a transferor device, the document including a selectable option to request separation of a transfer into a plurality of transfer time periods;
receive a request to separate the transfer into the plurality of transfer time periods, the request defining a total amount and a total time period and wherein the transfer is associated with the document;
prepare a plurality of request for transfer links, each of the links associated with a different transfer time period, wherein each transfer time period is less than or equal to the total time period, each of the links associated with a separate transfer part amount, wherein a summation of the separate transfer part amounts is equal to the total amount;
provide the plurality of request for transfer links displayed on an interface to the transferor device, each link allowing a transfer to fulfill the separate transfer part amount to be performed without requiring input of the separate transfer part amount or recipient information;
receive, from the transferor device, at least one transfer associated with one of the plurality of request for transfer links;
associate the at least one transfer with the document; and
in response to receiving all the transfers associated with the plurality of request for transfer links, reconcile the transfers with the document.

* * * * *